March 8, 1966

C. K. BROWN, JR 3,239,200

AUTOCLAVE DECOMPRESSION SYSTEM

Filed Oct. 22, 1963

INVENTOR
CHARLES K. BROWN, JR.

BY Walter G. Finch
ATTORNEY

March 8, 1966 C. K. BROWN, JR 3,239,200
AUTOCLAVE DECOMPRESSION SYSTEM
Filed Oct. 22, 1963 3 Sheets-Sheet 3
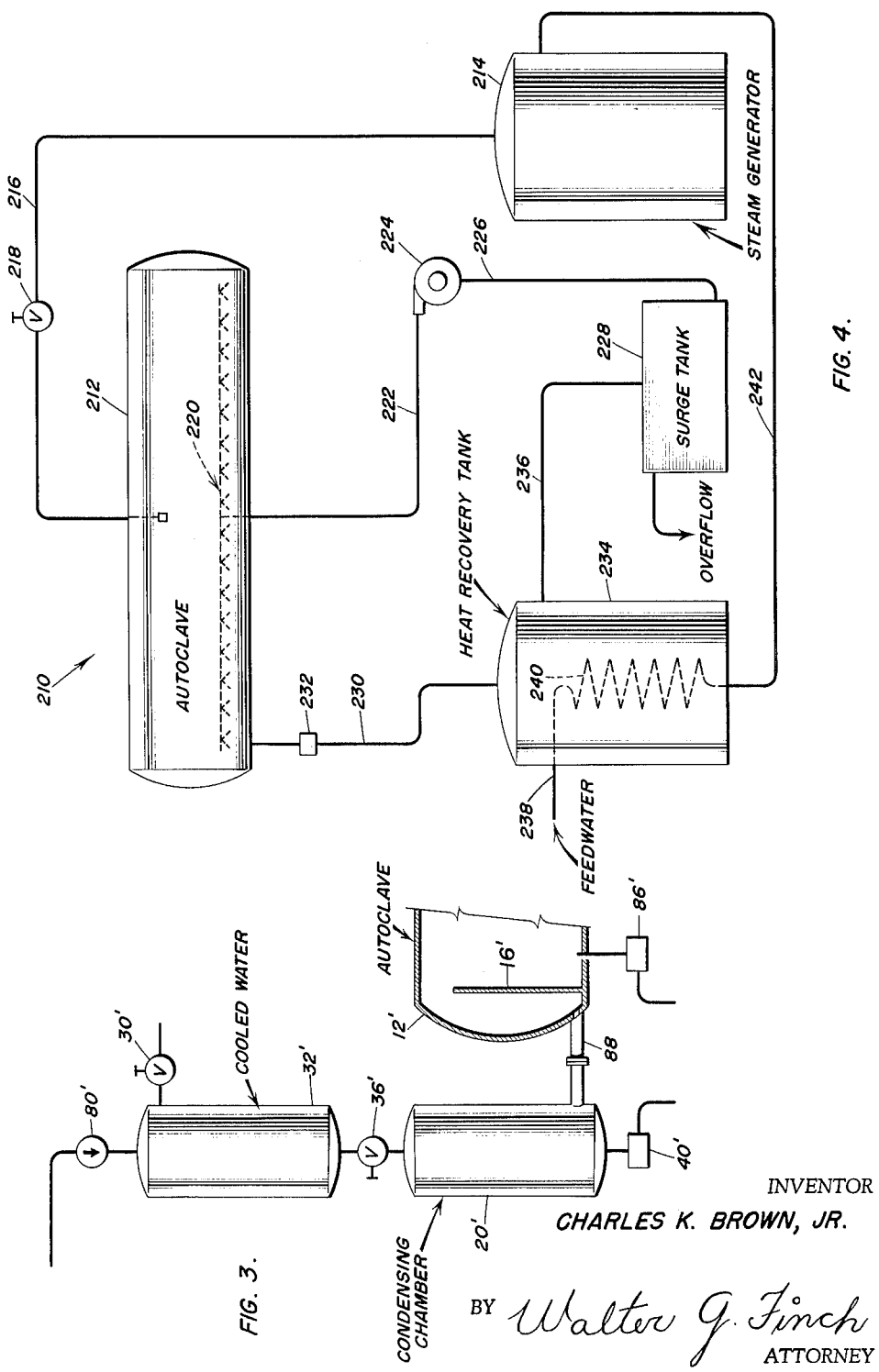
INVENTOR
CHARLES K. BROWN, JR.
BY Walter G. Finch
ATTORNEY

United States Patent Office 3,239,200
Patented Mar. 8, 1966

3,239,200
AUTOCLAVE DECOMPRESSION SYSTEM
Charles K. Brown, Jr., 8317 Robert Bruce Drive,
Bon Air, Richmond, Va.
Filed Oct. 22, 1963, Ser. No. 318,023
5 Claims. (Cl. 261—64)

This invention relates generally to heat exchange devices, and more particularly it pertains to an autoclave decompression system.

Autoclaves are commonly used to accelerate a process by heat and pressure. For example, the curing of concrete products can be considerably hastened through such practice. Heretofore, the operation of autoclaves has been wasteful and expensive. When the curing time was over, the autoclave was brought to atmospheric pressure by simply opening an exhaust valve and allowing the steam to vent to the atmosphere in a "blow-off." This is extremely wasteful of heat and also creates a fog hazard and noise nuisance.

Accordingly, it is a primary object of the present invention to provide a system for economically and quickly decompressing autoclaves.

Another object of this invention is to provide a decompression and heat interchange system for intersuccessive use with two or more autoclaves.

Still another object of this invention is to provide a condensing chamber for decompressing autoclaves quickly and silently.

And yet another object of this invention is to provide a spray system which cools and decompresses an autoclave rapidly and efficiently.

In the present invention, the "blow-off" is replaced by an arrangement for condensing the steam within the autoclave by introducing cold water therein or to a chamber immediately adjacent thereto and then recovering the heat that would ordinarily be wasted from the heated water. In the recovery of the heat from the condensing water, it is cooled for use in the next cycle. The cooling medium is the boiler feed water, ordinarily required to replace that converted to steam, and in the present system it becomes desirably preheated for introduction to the boiler utilizing heat that would otherwise be lost. As a consequence of the condensation of the steam in the autoclave, pressure therein is quickly brought down to atmospheric. The autoclave may then be opened for recharging.

These and other objects and attendant advantages of this invention will become more readily apparent and understood from the following detailed specification and accompanying drawings in which:

FIG. 1 is a schematic diagram of an autoclave decompression system incorporating features of this invention;

FIG. 3 is a schematic depiction of an alternate embodiment of a condensing chamber for use with the systems illustrated in FIGS. 1 and 2; and FIG. 4 is a schematic diagram of another embodiment of an autoclave decompressing system wherein the entire autoclave is used as a condensing chamber.

Figure 2:
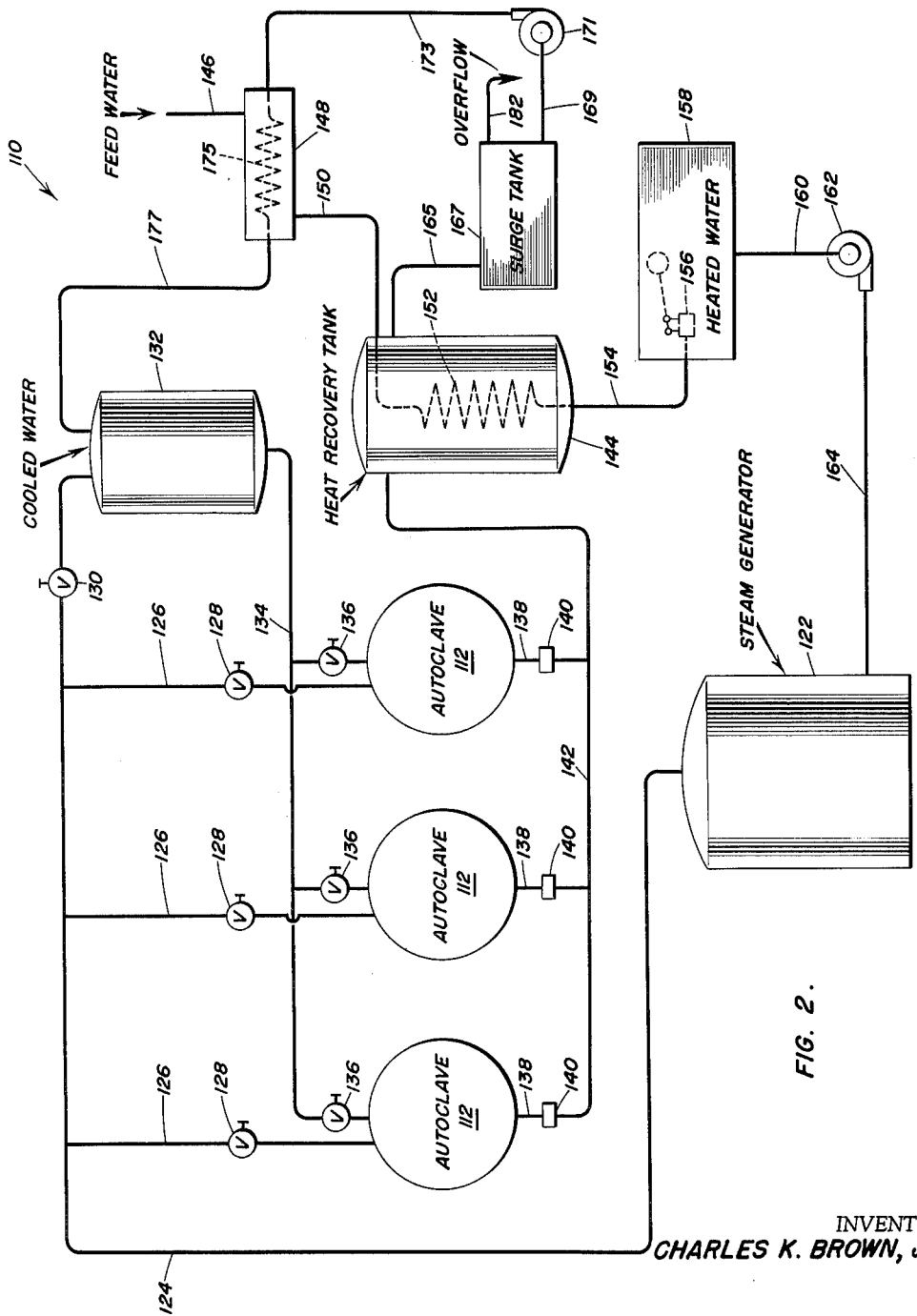
FIG. 2 is a schematic diagram of a multiple autoclave decompression system incorporating features of this invention.

Referring now to FIG. 1 of the drawing, the novel autoclave decompression system designated generally by reference numeral 10 consists of an autoclave 12 having a processing chamber 14. A pair of spaced baffles 16 and 18 define a condensing chamber 20 within one end thereof.

A steam generator 22 provides high pressure steam over steam lines 24 and 26 to the autoclave 12 when a valve 28 is opened.

At the completion of the time of curing or other desired processing of articles within the processing chamber 14, the valve 28 is closed and valves 36 and 30 are opened. Cooled water, that is below the range of 170° to 180° F., is introduced at first by gravity to the condensing chamber 20 through a line 34 which connects to a cooled water tank 32.

Soon after steam condensation starts, the pressure within the condensing chamber 20 and the communicating process chamber 14 will drop. With valve 30 open, steam pressure above the water in the cooled water tank 32 will accelerate the water flow and still further the rate of condensation of the steam.

At completion of this decompression operation, the valves 30 and 36 are shut off. Cooled water from a surge tank 72 is then raised through a line 74 and forced by a pump 76 through a line 78 and a check valve 80 into the cooled water tank 32. This water condenses the pressurizing steam remaining therein and allows the tank 32 to be recharged with more water without venting.

Hot condensate water which forms from the condensing steam within the autoclave 12 (chambers 20 and 14) is ejected through lines 38 and 84 and traps 40 and 86 during the period of positive pressure. After the pressure becomes close to atmospheric, a small amount of water will still remain until the pressure build-up of the next cycle forces it out.

This ejected water from the traps 40 and 86 passes over lines 42 and 43 into a heat recovery tank 44. Cold boiler feed water from a feedwater line 46 passes through a heat exchanger 48. Overflow condensate hot water from a connecting line 66 which is attached to the heat recovery tank 44 passes through a coil 68 within the heat exchanger 48 on its way to the previously mentioned surge tank 72. Thus, the surge tank 72 is continuously replenished with cooled water through line 70 and any surplus is dumped by the overflow line 82.

The warmed feed water emerging from the heat exchanger 48 is conducted over a line 50 to a coil 52 within the heat recovery tank 44. Here it is raised to a still higher temperature and passed over a line 54 and valved as needed by a float valve 56 into a storage or heated water tank 58.

From this tank 58, hot feed water is withdrawn by a pump 62 over a line 60 and forced through a line 64 into the steam generator 22 in the conventional boiler replenishment operations.

It will be noted that all condensate formed in the autoclave 12 is accumulated for heat recovery and the resulting heat carried by the fresh feed water to the steam generator 22. Furthermore, the condensate water is re-used after this cooling for the condensing chamber function. No noisy blasts of "blow-off" are required to reduce pressure to allow the autoclave to be opened and considerable economy of operation is achieved.

As shown in FIG. 3, it may be more convenient to provide the condensing chamber external of the autoclave. Here a condensing chamber 20' is joined by means of a conduit 88 to an autoclave 12'. If the conduit 88 is made large enough, it will serve to conduct steam drawn from the autoclave 12' by the lowered pressure in the condensing chamber 20' as well as the small amount of condensate formed to the left of the baffle 16'. In the manner previously related, cooled water is valved into the cooled water tank 32' through a check valve 80'. By manipulating the valves 30' and 36', the cooled water is delivered to the condensing chamber 20' where it condenses any steam found therein. The resulting lowered pressure brings in more steam from the autoclave 12' to be condensed and then drained for heat recovery and cooling along with the autoclave condensate through traps 40' and 86' respectively.

The decompression system 110 shown in FIG. 2 is especially effective for large multiple autoclave plants. Here, a plurality of autoclaves 112 are effectively connected to a parallel arrangement, each being separately served by a steam line 126 and a valve 128, a cooled water admittance valve 136, and a condensate drain line and trap 138 and 140 respectively.

A steam generator 122 provides high pressure steam for the autoclaves 112 over a common steam line 124. Only one cooled water tank 132 and steam admittance valve 130 is required since for continuous production the processing cycles of the autoclaves are arranged to be staggered and only one autoclave 112 will be decompressed at a time over the line 134.

Hot condensate from the traps 140 is delivered over a line 142 to a heat recovery tank 144 and passes with reduced temperature thence over a line 165 to a surge tank 167. A pump 171 carries this water over lines 169 and 173 to a heat exchanger 148 in the coil 175 by which it is further cooled by cold feed water entering at line 146. The cooled water now passes from the coil 175 over line 177 to the previously mentioned cooled water tank 132.

The warmed feed water from heat exchanger 148 is routed over line 150 to gather more heat as it passes through a coil 152 in the heat recovery tank 144 and emerges well heated at line 154 to be valved into a heated water tank 158 as required by float valve 156.

A feedwater pump 162 conveys the heated feed water over lines 160 and 164 to the steam generator 122 to replace the water converted to steam. An overflow line 182 from the surge tank 167 is used to dispose of excess, condensate water formed in the autoclaves 112.

Another embodiment of the invention is shown in FIG. 4 and designated generally by reference numeral 210. In this system 210, an autoclave 212 is pressurized with high pressure steam from a steam generator 214 through a line 216 and a valve 218.

Decompression of the autoclave 212 is accomplished by closing the valve 218 and pumping cooled recovered condensate water from a surge tank 228 by means of a pump 224 and connecting lines 226 and 222. The latter line 222 is attached within the autoclave 212 to a distributed spray system 220.

Autoclave pressure drops rapidly as the steam therein is condensed. The condensate and spray water passes through the trap 232 and is returned to the surge tank 228 over lines 230 and 236. Enroute, this hot condensate and spray water is caused to give up its heat in a heat recovery tank 234. Clean, cold feedwater from a line 238 receives this heat in a coil 240 within the heat exchanger 234 and passes over a line 242 to be injected hot into the steam generator 214 as required.

Instead of utilizing the pressure tank 32 and the valve 30 to inject the water into the autoclave, the tank 32 and the valve 30, can be eliminated or bypassed, and the pump 76 can be utilized to pump the fluid directly into the autoclave.

Obviously many modifications and variations of the present invention are possible in the light of the above teachings. It is, therefore, to be understood that within the scope of the appended claims the invention may be practiced otherwise than as specifically described.

What is claimed is:

1. An autoclave decompression system comprising structure defining a first chamber having a baffle member adjacent one side extending from the bottom of said first chamber to a point adjacent its top to define an aperture between said one side of said first chamber and the opposite side thereof, with said opposite side being for receiving steam under pressure, structure defining a second chamber having an opening in the bottom of said one side of said first chamber to communicate with said opposite side thereof via said aperture, whereby steam from said opposite side of said first chamber enters said second chamber, means for adding water to said second chamber to condense the steam therein, whereby the steam pressure in said second chamber lowers to cause additional steam from said opposite side of said first chamber to enter said second chamber and condense, and means for withdrawing said water and condensate from said second chamber and condensate from said opposite side of said first chamber.

2. The autoclave decompression system as recited in claim 1 wherein said means for adding water includes a pressurizable tank for supplying water by gravity to said second chamber, and pipe means including a valve is provided communicating between the top of said opposite side of said first chamber and the top of said tank, whereby the steam under pressure in said opposite side of said first chamber can enter said tank to pressurize it thereby increasing the supply of water therefrom to said second chamber.

3. The autoclave decompression system as recited in claim 1 wherein said structure defining a first chamber and said structure defining a second chamber are separate tanks.

4. The autoclave decompression system as recited in claim 1 wherein said first chamber and said second chamber are in the same tank.

5. An autoclave decompression system comprising a tank structure having a first baffle therewithin to define a first chamber for steam and a second baffle alternately staggered with said first baffle to define a second chamber within said tank structure, with said first and second baffles being vertically extending and terminating short of the top and bottom of said tank structure, respectively, so that steam from said first chamber communicates with said second chamber via over the top of said first baffle and beneath said second baffle, means for adding water to said second chamber to condense the steam therein, whereby the steam pressure in said second chamber lowers to cause additional steam from said first chamber to enter said second chamber and condense, and means for withdrawing said water and condensate from said second chamber and condensate from said first chamber.

References Cited by the Examiner

UNITED STATES PATENTS

| | | | |
|---|---|---|---|
| 1,144,533 | 6/1915 | Dwofsky et al. | 237—67 |
| 1,722,884 | 7/1929 | Autrey | 126—362 |
| 3,026,043 | 3/1962 | Lacy et al. | 23—290 X |

FREDERICK L. MATTESON, JR., *Primary Examiner.*

JAMES W. WESTHAVER, ROBERT A. DUA,
*Examiners.*